United States Patent [19]

Bock

[11] 4,332,913
[45] Jun. 1, 1982

[54] FLUX COMBINATION OF BARIUM OXIDE AND POTASSIUM FELDSPAR FOR HIGH-STRENGTH ALUMINA PORCELAIN ELECTRIC INSULATORS

[75] Inventor: Peter Bock, Bayreuth, Fed. Rep. of Germany

[73] Assignee: Rosenthal Technik AG, Selb, Fed. Rep. of Germany

[21] Appl. No.: 173,812

[22] Filed: Jul. 30, 1980

[30] Foreign Application Priority Data

Aug. 14, 1979 [DE] Fed. Rep. of Germany ....... 2932914

[51] Int. Cl.³ .............................................. C04B 33/26
[52] U.S. Cl. .................................... 501/144; 501/153; 501/127
[58] Field of Search ................ 106/46, 306, 313, 73.4, 106/45; 264/61; 501/144, 153

[56] References Cited

U.S. PATENT DOCUMENTS

| | | | |
|---|---|---|---|
| 1,909,785 | 5/1933 | McDougal | 106/313 |
| 2,213,495 | 9/1940 | Hagar | 106/45 |
| 2,261,884 | 11/1941 | Koenig | 106/313 |
| 3,686,007 | 8/1972 | Gion | 106/46 |
| 4,183,760 | 1/1980 | Funk et al. | 501/144 |
| 4,204,874 | 5/1980 | Yamada | 106/73.4 |
| 4,226,635 | 11/1980 | Kindrick | 106/306 |

FOREIGN PATENT DOCUMENTS

| | | |
|---|---|---|
| 741142 | 11/1943 | Fed. Rep. of Germany . |
| 1243744 | 5/1960 | Fed. Rep. of Germany . |
| 1292568 | 1/1961 | Fed. Rep. of Germany . |
| 1227821 | 5/1962 | Fed. Rep. of Germany . |
| 711009 | 1/1980 | U.S.S.R. ............................. 501/128 |

OTHER PUBLICATIONS

Blodgett, W. E. "High Strength Alumina Porcelains", Cer. Bull. '(1961), pp. 74-77.
Extremely High Strength Porcelain, Prepared by McGraw-Edison Co., Apr. 1978, EL-722 Research Project 427-1, pp. 1-19, 4-20, 4-21, 4-40 and 4-43.
Improvement of Electrical Porcelain Insulators, Prepared by Gould, Inc., EL-721-SY Research Project 424-1, pp. 1-13.

*Primary Examiner*—Helen M. McCarthy
*Attorney, Agent, or Firm*—Schwartz, Jeffery, Schwaab, Mack, Blumenthal & Koch

[57] ABSTRACT

Disclosed is an alumina porcelain composition, suitable for use after firing to form electric insulators, comprising from about 40 to 65% by weight of calcined alumina, from about 15 to 40% by weight of plastic kaolinite-montmorillonite constituents, and from about 20 to 26% by weight of a flux combination which contains alkali-aluminum silicates and from about 0.1 to 5% by weight of one or more alkaline earth oxides, preferably in the form of alkaline earth compounds. The flux combination preferably comprises about 22 to 24% by weight of potassium-aluminum silicates and from about 0.2 to 2.5% by weight of barium oxide in the form of barium compounds, thus avoiding the disadvantages associated with the use of $TiO_2$ and $MnO_2$.

11 Claims, 1 Drawing Figure

U.S. Patent   Jun. 1, 1982   4,332,913
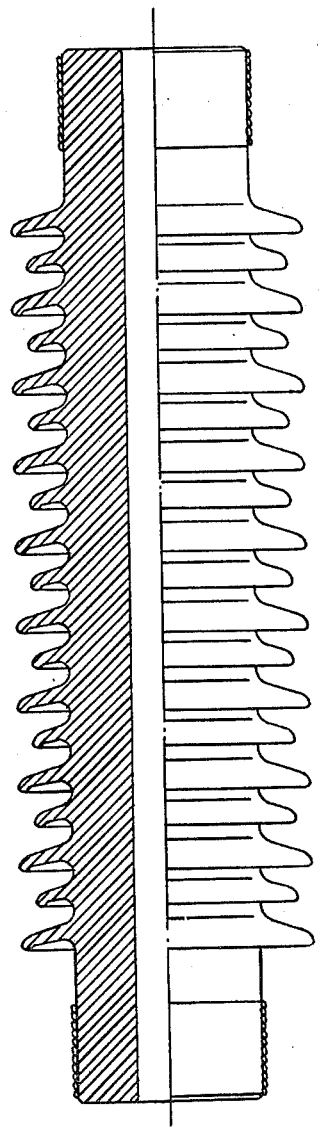

FLUX COMBINATION OF BARIUM OXIDE AND POTASSIUM FELDSPAR FOR HIGH-STRENGTH ALUMINA PORCELAIN ELECTRIC INSULATORS

BACKGROUND OF THE INVENTION

The present invention relates to high-strength alumina porcelain compositions for electric insulators, and more particularly to such compositions of the kind comprising a non-plastic portion of calcined alumina, a plastic portion of clays and kaolins, and a flux portion of feldspars and micaceous minerals, for firing at temperatures between 1,250° and 1,400° C. These compositions are used especially in or as large and complicated electric insulators.

Alumina porcelains have gained in importance in recent years on account of their considerably superior strength, in comparison with quartz porcelain, especially in the field of high-voltage insulation. Nevertheless, still relatively little is known as to the phase constitution of alumina porcelains and the formation and solution processes of their various components. This appears from a report by R. Stabenow and H. W. Hennicke "Inquiries Into Phase Constitution, Structure and Mechanical Properties of Alumina Procelain", *Keramische Zeitschrift* (1976), pages 227 to 229. There it is mentioned that the proportion of glass has hardly any influence upon the strength, but that a rising proportion of corundum appreciably increases the strength. Also included is a discussion of the significance of the pore structure for the strength of the alumina porcelain. One investigated composition contained 23% by weight of corundum in the form of calcined alumina, with about 8% by weight coming from the clay portion and 20% by weight from the flux portion in the form of feldspar and nepheline syenite, so that the total $Al_2O_3$ content in the body was about 51% by weight. Furthermore, it is known from *Ceramic Bulletin*, Vol. 40 (1961), pages 44 to 77, to replace feldspar, which is introduced from orthoclase or albite into alumina compositions, entirely or partially by alkali-containing fluxes such as nepheline syenite, and to use additions of manganese dioxide and wollastonite.

By reason of its high $Na_2O$ content, nepheline syenite leads to an aggressive flux action and shortens the sintering interval. Correspondingly, the durability and distortion resistance during firing are reduced. Fired materials with this constituent have a higher proportion of glass phase and more pores, thus resulting in poorer mechanical and electric strength.

The use of feldspars, clays and calcined alumina for the production of electric insulators is likewise known from German Pat. No. 1,571,372, and U.S. Pat. No. 3,686,007 in which an alumina porcelain is described having a composition of 15 to 45% by weight of calcined alumina, 30 to 60% by weight of clays and kaolins, and a flux portion of <20% by weight. The flux portion consists of feldspar and nepheline syenite and 0.5 to 4% by weight of $TiO_2$-$MnO_2$. Fluxes such as manganese dioxide and especially titanium dioxide, when present in aluminum-containing compositions, even with small additions of about 0.2% by weight, as also occur as impurities in unusable clays and kaolins, lead to a drastic restriction of the sintering interval with the above-stated consequences. Furthermore, both oxides react sensitively in a reducing kiln atmosphere, as is usual in ceramic firing. This forms the oxygen-poorer, semi-conductive oxides $Ti_2O_3$ and $TiO$ which additionally uncontrollably reinforce the flux effect and reduce the electric insulation capacity.

Porcelain compositions, especially with a content of above 40% by weight of calcined alumina, have not in practice satisfied all technological and electro-mechanical requirements. Since the calcined alumina represents a non-plastic constituent, difficulties arise as regards the deformability of the composition, especially in the case of large and complicated insulators. On the other hand, a high proportion of flux leads to a narrow sintering range. Thus, the danger exists of the composition becoming too soft, and deforming under the action of its own weight, in the firing of the products. If, on the other hand, the proportion of flux is too low, the sintering process does not progress sufficiently, so that a product with the desired structure cannot be achieved. In extreme cases, one obtains partially porous articles which do not conform with the required electrical and mechanical properties. As appears from the prior art, hitherto it has been sought to solve this problem in various ways, without however recognizing the full significance of the proportion of flux.

SUMMARY OF THE INVENTION

It is therefore an object of the present invention to provide an improved alumina porcelain composition.

It is also an object of the present invention to provide an improved alumina porcelain composition particularly suitable for large insulators, by the selection of specific flux combinations which are technologically better controllable and after firing possess high mechanical strength.

In accomplishing the foregoing objects, there has been provided in accordance with the present invention an alumina porcelain composition, comprising from about 40 to 60% by weight of calcined alumina, from about 15 to 40% by weight of plastic kaolinite-montmorillonite constituents, and from about 20 to 26% by weight of a flux combination comprising alkali-aluminum silicates and from about 0.1 to 5% by weight of at least one alkaline earth oxide or a compound which forms the alkaline earth oxide under firing conditions. In one preferred embodiment, the flux combination comprises from about 22 to 24% by weight of potassium-aluminum silicates and from about 0.2 to 2.5% by weight of barium oxide in the form of barium compounds. In another preferred embodiment, the flux combination comprises from about 22 to 24% by weight of potassium-aluminum silicates and from about 0.2 to 2.5% by weight of a mixture of alkaline earth oxides, wherein up to half of the mixture comprises at least one of MgO or SrO, with the remainder comprising BaO.

Also provided according to the invention is an alumina porcelain composition as defined above which has been fired to form a sintered body.

In accordance with another aspect of the present invention, there has been provided an electric insulator comprising a shaped body of an alumina porcelain composition, wherein the composition comprises the alumina porcelain composition defined above.

Further objects, features and advantages of the present invention will become apparent from the detailed description of preferred embodiments, which follows.

BRIEF DESCRIPTION OF THE DRAWING

The FIGURE of drawing is an elevational view, partly in section, of an electric insulator made from the alumina porcelain composition according to the present invention.

DETAILED DESCRIPTION OF PREFERRED EMBODIMENTS

In accordance with the present invention, an alumina porcelain composition which is particularly suitable for use after firing in forming electric insulators is comprised of about 40 to 65% by weight of calcined alumina, about 15 to 40% by weight of plastic kaolinite-montmorillonite constituents, and about 20 to 26% by weight of a flux combination which contains alkali-aluminum silicates and about 0.1 to 5% by weight of alkaline earth oxides in the form of alkaline earth compounds.

Preferably, the flux combination comprises about 22 to 24% by weight of potassium-aluminum silicates and about 0.2 to 2.5% by weight of barium oxide in the form of barium compounds.

It is also advantageous to replace up to half of the BaO by MgO and/or SrO. The different properties of these bivalent alkaline earth metal ions render possible a better adaptation of the flux combination to the firing conditions in each case. It is also advantageous if the barium, magnesium and/or strontium oxides are used in the form of compounds containing these oxides, for example, feldspars, or compounds from which these oxides form in firing, for example, carbonates and hydrates.

Likewise, it is advantageous if the starting materials are ground so that about 65 to 95% by weight, preferably about 85% by weight of the total composition has a particle size of <20 μm.

The preferred combination of BaO with from about a ten to fifty fold proportion of potassium-aluminum silicate leads to surprisingly good sintering properties in alumina procelain compositions. Thus, it is possible to sinter such compositions densely at normal firing temperatures, despite the high proportion of calcined alumina and without special fine grinding of the starting constituents.

Furthermore, the improved flux combination renders possible maximum exploitation of the relatively expensive alumina constituent as a strength bearer.

BaO, even in a reducing kiln atmosphere, also proves stable and forms a series of stable compounds with $Al_2O_3$ and $SiO_2$. This affinity of BaO for $Al_2O_3$ and $SiO_2$, and the higher valency of the $Ba^{++}$ ions, in the cooling of the eutectic phases, cause a heavy precipitation of microcrystals, which additionally favorably influences above all the strength and density of the alumina porcelain. In addition, the normal to coarse grinding of the starting materials, usable here, renders possible a low-textured shaping and reduces the crack susceptibility in drying and firing, especially of large and complicated shaped articles. Moreover, by reason of the relatively low proportion of the flux combination, the plastic raw material constituents can be introduced in adequate quantity, and thus the flow behaviour of the composition can also be advantageously influenced.

The present invention will now be explained in greater detail with reference to several examples, which are merely illustrative and not limiting.

The chemical compositions of the starting materials used in these examples appear from Table 1, in which dotted horizontal lines define three sections: the upper section listing various plastic kaolinite-montmorillonite constituents; the middle section listing various flux constituents; and the lower section listing two grades of calcined alumina.

TABLE 1

| STARTING MATERIALS | HEATING LOSS | COMPOSITION IN PERCENT BY WEIGHT ||||||||||
|---|---|---|---|---|---|---|---|---|---|---|---|
| | | $SiO_2$ | $TiO_2$ | $MnO_2$ | $Al_2O_3$ | $Fe_2O_3$ | CaO | MgO | BaO | $K_2O$ | $Na_2O$ |
| Clay A | 10.1 | 55.0 | 0.4 | — | 32.4 | 1.1 | 0.4 | 0.2 | — | 0.2 | 0.2 |
| Bentonite B | 7.1 | 57.5 | — | — | 21.5 | 5.3 | 0.8 | 3.3 | — | 1.8 | 2.7 |
| Kaolin C | 11.5 | 53.9 | 0.1 | — | 32.6 | 0.6 | 0.2 | 0.2 | — | 0.9 | — |
| Kaolin D | 13.0 | 47.4 | 0.2 | — | 37.0 | 0.9 | 0.1 | 0.4 | — | 1.0 | — |
| Potash feldspar | 0.3 | 65.1 | 0.1 | — | 18.4 | — | trace | 0.1 | 0.5 | 15.3 | 0.2 |
| Nepheline syenite | 0.3 | 59.9 | tr. | — | 23.3 | 0.1 | 0.3 | tr. | — | 5.0 | 11.1 |
| Barium Carbonate | 23.2 | — | — | — | — | — | — | — | 76.8 | — | — |
| Manganese dioxide | 1.8 | 2.9 | tr. | 90.4 | 1.8 | 1.6 | 1.0 | 0.2 | — | 0.3 | — |
| Titanium dioxide | 1.0 | — | 99.0 | — | — | — | — | — | — | — | — |
| Calcined alumina 1 | 0.2 | 0.1 | — | — | 99.3 | tr. | — | — | — | — | 0.4 |
| Calcined alumina 2 | 0.2 | tr. | — | — | 99.6 | tr. | — | — | — | — | 0.2 |

The production of insulators from a composition in accordance with the invention takes place in a manner known per se, in that the starting materials are ground in a ball mill, the weight ratio of ground material to grinding balls to water amounting to 1:1:0.5 to 1. The prepared composition is dried on a filter press and shaped by pressing, extrusion, turning or casting. The bodies thus obtained are then dried by the methods usual in ceramics, and fired smooth at 1,250° to 1,400° C.

EXAMPLE 1

This composition according to the invention has, at 42.0% by weight, a relatively low content of calcined alumina, but the optimum solution is used as regards the flux combination.

| | |
|---|---|
| Calcined alumina 1 | 24.7% by weight |
| Calcind alumina 2 | 17.3% by weight |
| Clay A | 11.3% by weight |
| Bentonite B | 1.5% by weight |
| Kaolin C | 11.9% by weight |
| Kaolin D | 12.4% by weight |
| Potash feldspar | 19.8% by weight |
| (90% by weight | | orthoclase)
Barium carbonate 1.1% by weight

The production of samples took place according to the above-described method, 85% of the crude mass being brought to a ground fineness of <20 μm. Unglazed moldings are produced and tested according to DIN 40,685 for mechanical strength and sag in firing in accordance with the Deutsche Keramik-Gesellschaft Expert Committee Report No. 5. The firing took place in an industrial kiln at 1,350° C. The obtained alumina porcelain has a density of 2.75 kg./cu.dm., a bending strength of 192 N/sq.mm. and a firing sag of 16 mm. The chemical analysis in this example shows the following composition after firing:

| | |
|---|---|
| $SiO_2$ | 33.8% by weight |
| $TiO_2$ | 0.1% by weight |
| $Al_2O_3$ | 60.7% by weight |
| $Fe_2O_3$ | 0.4% by weight |
| CaO | 0.1% by weight |
| MgO | 0.2% by weight |
| BaO | 1.0% by weight |
| $K_2O$ | 3.5% by weight |
| $Na_2O$ | 0.2% by weight |

EXAMPLE 2

For better understanding of the invention, a further alumina porcelain composition in accordance with the invention, with 58% by weight of calcined alumina, is compared with a composition known from the prior art with the same alumina content and very similar mineralogical composition.

TABLE 2

| STARTING MIXTURE IN % BY WEIGHT | COMPOSITION ACCORDING TO THE INVENTION I | KNOWN COMPOSITION II |
|---|---|---|
| Calcined alumina 1 | 38.0 | 38.8 |
| Calcined alumina 2 | 20.0 | 20.0 |
| Clay A | 8.5 | 8.5 |
| Bentonite B | 5.0 | 5.0 |
| Kaolin D | 8.0 | 9.0 |
| Potash feldspar (90.4% by weight orthoclase) | 17.5 | 9.5 |
| Neptheline syenite | — | 8.0 |
| Barium carbonate | 3.0 | — |
| Addition: ⅓ $TiO_2$ and ⅔ $MnO_2$ | — | 2.0 |

The production of unglazed shaped articles, including firing, takes place according to Example 1. It should be noted that the composition I according to the invention displays good workability and no special actions are necessary in all the method steps of preparation, shaping, drying and firing. The properties of alumina porcelains obtained under the same experimental conditions may be seen from Table 3.

TABLE 3

| MEASURED VALUES | UNIT | COMPOSITION ACCORDING TO THE INVENTION I | KNOWN COMPOSITION II |
|---|---|---|---|
| Firing sag | mm. | 18.5 | 41.0 |
| Closed pores | % | 5.0 | 11.0 |
| Density | Kg/dm³ | 3.10 | 2.95 |
| Bending strength | N/mm² | 255.0 (37.010 psi) | 213.0 (36.914 psi) |
| Chemical analysis: | | | |
| $SiO_2$ | wt. % | 23.5 | 23.5 |
| $TiO_2$ | wt. % | 0.1 | 0.8 |
| $MnO_2$ | wt. % | — | 1.2 |
| $Al_2O_3$ | wt. % | 69.8 | 70.3 |
| $Fe_2O_3$ | wt. % | 0.4 | 0.5 |
| CaO | wt. % | 0.1 | 0.1 |
| MgO | wt. % | 0.2 | 0.2 |
| BaO | wt. % | 2.5 | — |
| $K_2O$ | wt. % | 3.0 | 2.1 |
| $Na_2O$ | wt. % | 0.4 | 1.3 |

The comparison with composition I according to the invention shows clearly that, in the known composition II, the aggressive fluxes such as nepheline syenite, $MnO_2$ and $TiO_2$ increase the firing deformation, reduce the sintering density and impair the bending strength.

The alumina porcelain composition according to the invention is distinguished, after firing, by an improved mechanical strength, electric insulating capacity, corrosion resistance and thermal shock resistance. This is attributable to the fact that the sintered material possesses a relatively low glass phase proportion, a high density and a high mechanical strength. Moreover, by the application of a suitable hard-fire glaze, in a manner known per se, the bending strength on standardized bars is further increased by about 25%.

In the experiments, the composition and the experimental conditions are especially adapted to the technological demands for the production of large electrical insulators, so that the composition is also industrially exploitable. The optimum sintering properties of the flux combination of alkali-aluminum silicates with alkaline earth oxides in the form of alkaline earth compounds render possible the use of a medium fineness of grinding, an adequate plastic substance proportion and a very high alumina proportion of 40 to 65% by weight with otherwise normal firing conditions between 1,250° and 1,400° C.

What is claimed is:

1. An alumina porcelain composition characterized by a low degree of deformation during firing which makes it suitable for large insulator bodies, said composition consisting essentially of: from about 40 to 60% by weight of calcined alumina, from about 15 to 40% by weight of plastic kaolinite-montmorillonite constituents, and from about 20 to 26% by weight of a flux combination consisting essentially of
   (a) from about 0.1 to 5% by weight based on the total composition of at least one alkaline earth oxide or a compound which forms the alkaline earth oxide under firing conditions, of which alkaline earth oxide at least about 50% is barium oxide, and
   (b) the balance potassium-aluminum silicates.

2. An alumina porcelain composition according to claim 1, wherein said flux combination comprises from about 0.2 to 2.5% by weight of barium oxide in the form of barium compounds.

3. An alumina porcelain composition according to claim 1, wherein said flux combination comprises from about 0.2 to 2.5% by weight of a mixture of alkaline earth oxides, wherein up to half of said mixture comprises at least one of MgO or SrO, with the remainder comprising BaO.

4. An alumina porcelain composition according to claim 1, wherein said alkaline earth-forming compound is selected from a compound which forms barium oxide when fired.

5. An alumina porcelain composition according to claim 1, 2, 3, or 4, wherein from about 65 to 95% by weight of the total composition has a particle size of <20 μm.

6. An alumina porcelain composition according to claim 5, wherein about 85% by weight of the total composition has a particle size of <20 μm.

7. An alumina porcelain composition according to claim 1, which has been fired to form a sintered body.

8. An electric insulator comprising a shaped body of an alumina porcelain composition, wherein said composition comprises the alumina porcelain composition of claim 7.

9. An alumina porcelain composition according to claim 7, having the following chemical analysis:

| | |
|---|---|
| $SiO_2$ | 33.8% by weight |
| $TiO_2$ | 0.1% by weight |
| $Al_2O_3$ | 60.7% by weight |
| $Fe_2O_3$ | 0.4% by weight |
| CaO | 0.1% by weight |
| MgO | 0.2% by weight |
| BaO | 1.0% by weight |
| $K_2O$ | 3.5% by weight |
| $Na_2O$ | 0.2% by weight | said composition having a firing sag of 16 mm (DIN 40,685).

10. An alumina porcelain composition according to claim 7, having the following chemical analysis:

| | |
|---|---|
| $SiO_2$ | 23.5% by weight |
| $TiO_2$ | 0.1% by weight |
| $Al_2O_3$ | 69.8% by weight |
| $Fe_2O_3$ | 0.4% by weight |
| CaO | 0.1% by weight |
| MgO | 0.2% by weight |
| BaO | 2.5% by weight |
| $K_2O$ | 3.0% by weight |
| $Na_2O$ | 0.4% by weight | said composition having a firing sag of 18.5 mm (DIN 40,685).

11. An alumina porcelain composition according to claim 1, wherein said flux combination comprises a potash feldspar having at least about 90% orthoclase.

* * * * *